US007011240B2

(12) United States Patent
Kan et al.

(10) Patent No.: US 7,011,240 B2
(45) Date of Patent: Mar. 14, 2006

(54) REAR LUGGAGE-CARRIER DEVICE FOR MOTORCYCLE

(75) Inventors: Makoto Kan, Niiza (JP); Yoshinori Mifune, Niiza (JP)

(73) Assignee: Honda Access Corporation, Niiza (JP)

(*) Notice: Subject to any disclaimer, the term of this patent is extended or adjusted under 35 U.S.C. 154(b) by 359 days.

(21) Appl. No.: 10/370,077

(22) Filed: Feb. 21, 2003

(65) Prior Publication Data

US 2004/0045990 A1 Mar. 11, 2004

(30) Foreign Application Priority Data

Sep. 5, 2002 (JP) ............................ 2002-260055

(51) Int. Cl.
*B62J 7/00* (2006.01)

(52) U.S. Cl. ........................ 224/413; 224/427; 297/92; 297/215.12; 280/304.4; 280/226.1

(58) Field of Classification Search ................ 224/413, 224/443, 427; 297/92, 359, 360, 215.12, 297/215.15; 280/226.1, 269, 304.4
See application file for complete search history.

(56) References Cited

U.S. PATENT DOCUMENTS 1,004,975 A * 10/1911 Blackman ................... 224/415
3,873,127 A * 3/1975 McNichol et al. .......... 280/202
3,901,534 A * 8/1975 Popken .................... 280/304.4
4,186,937 A * 2/1980 Schultz .................... 280/304.4
4,269,335 A * 5/1981 LaRose et al. .............. 224/443
5,725,138 A * 3/1998 Zagrodnik .................. 224/413
5,931,360 A * 8/1999 Reichert ..................... 224/413
5,997,088 A * 12/1999 Stark et al. ............ 297/354.13
6,568,699 B1 * 5/2003 McCann .................. 280/304.4

FOREIGN PATENT DOCUMENTS

| | | |
|---|---|---|
| JP | 10-147271 | 6/1998 |
| JP | 11-139369 | 5/1999 |
| JP | 11-198877 | 7/1999 |
| JP | 2002-127968 | 5/2002 |
| JP | 2002-160681 | 6/2002 |

OTHER PUBLICATIONS

Translation of portions of Japanese Publication No. 11-139369.

* cited by examiner

*Primary Examiner*—Tri M. Mai
(74) *Attorney, Agent, or Firm*—Arent Fox PLLC

(57) ABSTRACT

In a rear luggage-carrier device for a motorcycle, in which a rear carrier disposed in the rear of a pillion portion for a tandem rider is supported by a pair of stays secured to left and right rear portions of a vehicle body, a backrest is supported on the stays so that it can be turned between an upright position and a housed position. In the upright position, the backrest is located above a rear end of the pillion portion such that it can contact from behind the waist of a tandem rider on the pillion portion. In the housed position, the backrest has been turned rearward from above a rear end of the pillion portion and housed in a front portion of the rear carrier so that luggage can be placed on the backrest. Thus, relatively large luggage can be mounted on the rear carrier, operation of detaching the pillion portion from the vehicle body cannot be hindered, and moreover the backrest can be disposed in the rear of the pillion portion in order to improve the riding comfort of a tandem rider on the pillion portion.

5 Claims, 8 Drawing Sheets

REAR LUGGAGE-CARRIER DEVICE FOR MOTORCYCLE

BACKGROUND OF THE INVENTION

1. Field of the Invention

The present invention relates to a rear luggage-carrier device for a motorcycle, in which a rear carrier disposed in the rear of a pillion portion for a tandem rider is supported by a pair of stays secured to left and right rear portions of a vehicle body.

2. Description of the Related Art

A conventional rear luggage-carrier device for a motorcycle is already well-known from, for example, Japanese Patent Application Laid-open No. 2002-127,968.

A backrest is disposed in the rear of a pillion portion in some cases in order to improve the riding comfort of a tandem rider on the pillion portion, and such a backrest is usually fixed to a vehicle body. However, if the backrest is fixedly disposed between a rear carrier and the pillion portion, relatively large luggage cannot be mounted on the rear carrier with its portion protruding toward the pillion portion when there is no tandem rider. In addition, when operation of detaching the pillion portion from the vehicle body is carried out, the backrest obstructs this operation, so that it is difficult to smoothly carry out the detaching operation.

SUMMARY OF THE INVENTION

The present invention has been accomplished with such circumstance in view, and it is an object of the present invention to provide a rear luggage-carrier device for a motorcycle, wherein relatively large luggage can be mounted on a rear carrier, the operation of detaching the pillion portion from the vehicle body cannot be hindered, and moreover a backrest can be disposed in the rear of the pillion portion in order to improve the riding comfort of a tandem rider.

To achieve the above object, according to the first feature of the present invention, there is provided a rear luggage-carrier device for a motorcycle, in which a rear carrier disposed in the rear of a pillion portion for a tandem rider is supported by a pair of stays secured to left and right rear portions of a vehicle body, wherein a backrest is supported on the pair of stays so that it can be turned between an upright position in which it is located above a rear end of the pillion portion to contact from behind the waist of the tandem rider on the pillion portion, and a housed position in which it has been turned rearward from above the rear end of the pillion portion and housed in a front portion of the rear carrier so that luggage can be mounted on the backrest.

With this arrangement of the first feature, the backrest is turnable between the upright position and the housed position. In the upright position, the backrest can contact from behind the waist of a tandem rider on the pillion portion, and hence the riding comfort of the tandem rider can be improved. In the housed position, the backrest is housed in the front portion of the rear carrier, and hence the backrest does not exist between the rear carrier and the pillion portion, so that relatively large luggage can be mounted on the rear carrier in such a manner that a portion of the luggage protrudes toward the pillion portion when no tandem rider sits on the pillion portion. In addition, when the operation of detaching the pillion portion from the vehicle body B is carried out, the backrest does not obstruct this operation, and hence the detaching operation for the pillion portion can be smoothly achieved.

According to a second feature of the present invention, in addition to the arrangement of the first feature, a grip capable of being grasped by the tandem rider on the pillion portion is mounted between the stay and the rear carrier. With this arrangement, the feeling of security of the tandem rider can be improved, and the supporting rigidity of the rear carrier can be enhanced.

According to a third feature of the present invention, in addition to the arrangement of the first or second, supported members are mounted on opposite sides of the backrest and turnably supported on the stays; a locking pin is mounted in each of the supported members and biased by a spring in a direction to protrude at one end thereof from the supported member toward each of the stays; a pair of locking bores are provided in each of the stays so that one end of the locking pin is inserted through and engaged in any of the locking bores in the upright position and the housed position of the backrest; and an operating portion is provided at the other end of the locking pin protruding from the supported member on a side opposite from the stay. With this arrangement, it is possible to easily switch over, from one to another, a state in which the backrest is locked in its upright position and its housed position, and a state in which the locked state is released to permit the turning of the backrest between the upright position and the housed position.

DETAILED DESCRIPTION OF THE PREFERRED EMBODIMENT

The present invention will be described with reference to a preferred embodiment shown in the attached drawings.

Figure 1:
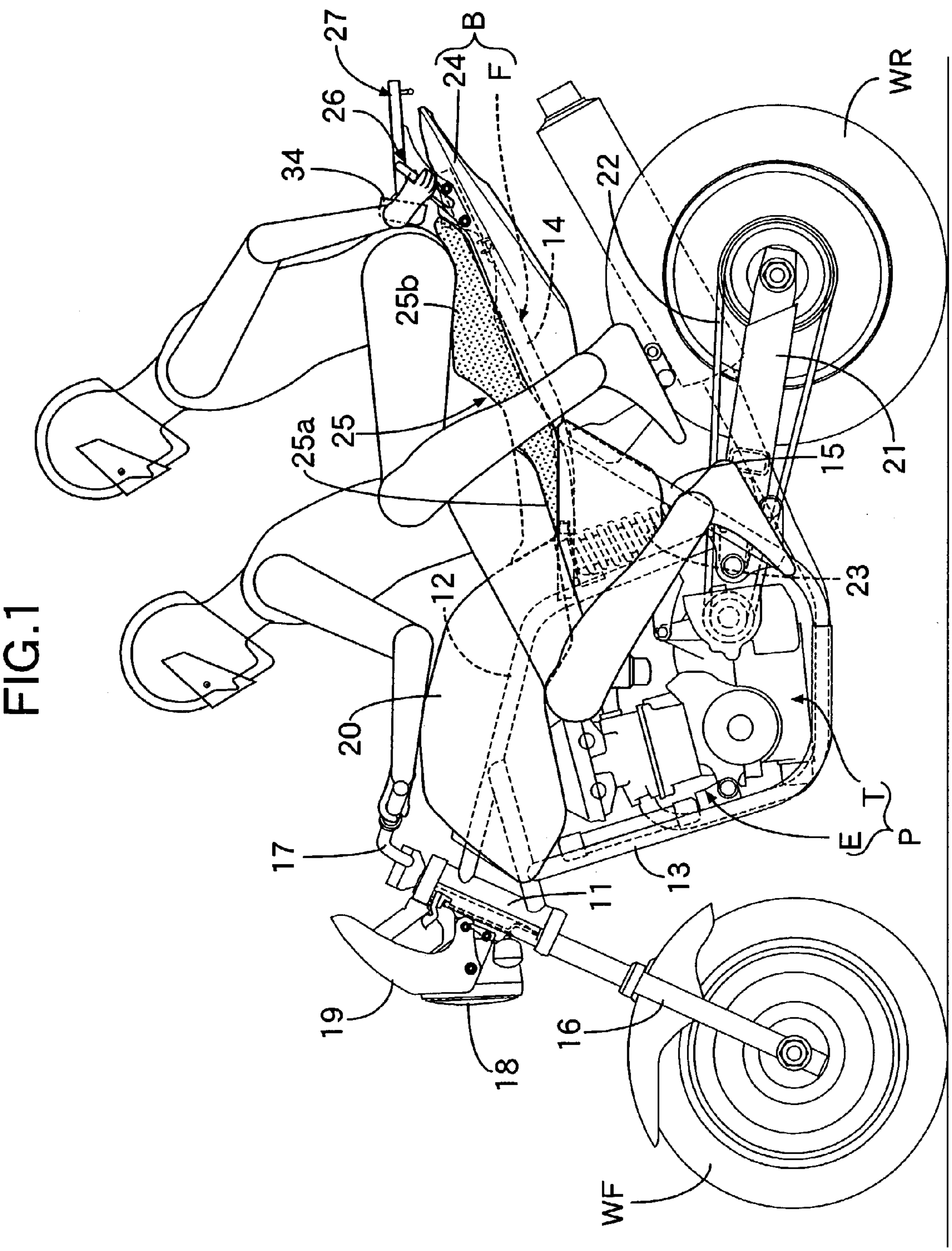
FIG. 1 is a side view of a motorcycle.

Referring first to FIG. 1, a vehicle body framework F of a motorcycle includes a head pipe 11, a main frame 12 extending rearward downward from the head pipe 11 and bent further downward at an intermediate portion, a pair of left and right down-tubes 13 extending rearward downward from the head pipe 11 below the main frame 12 and bent rearward at intermediate portions, a pair of left and right seat rails 14 extending rearward from the intermediate portion of the main frame 12, and a pair of lower pipes 15 extending rearward upward from rear ends of the down-tubes 13 and connected to the intermediate portions of the seat rails 14. The main frame 12 is connected at its rear end to intermediate portions of the lower pipes 15.

A front fork 16 for supporting a front wheel WF is steerably supported on the head pipe 11. A steering handlebar 17 is connected to an upper portion of the front fork 16. A head lamp 18 and a meter visor 19 are mounted to the upper portion of the front fork 16 in front of the head pipe 11.

A power unit P comprising an engine E and a transmission T is mounted on the vehicle body framework F such that it is disposed in a space surrounded by the main frame 12, the down-tubes 13 and the lower pipes 15. A fuel tank 20 is mounted on the main frame 12 astride the main frame 12 above the power unit P.

A rear fork 21 is pivotally supported at its front end on a rear portion of the main frame 12. An output from the power unit P is transmitted through a chain 22 to a rear wheel WR supported at a rear end of the rear fork 21. Further, a rear cushion 23 is mounted between the vehicle body framework F and the rear fork 21.

Figure 2:
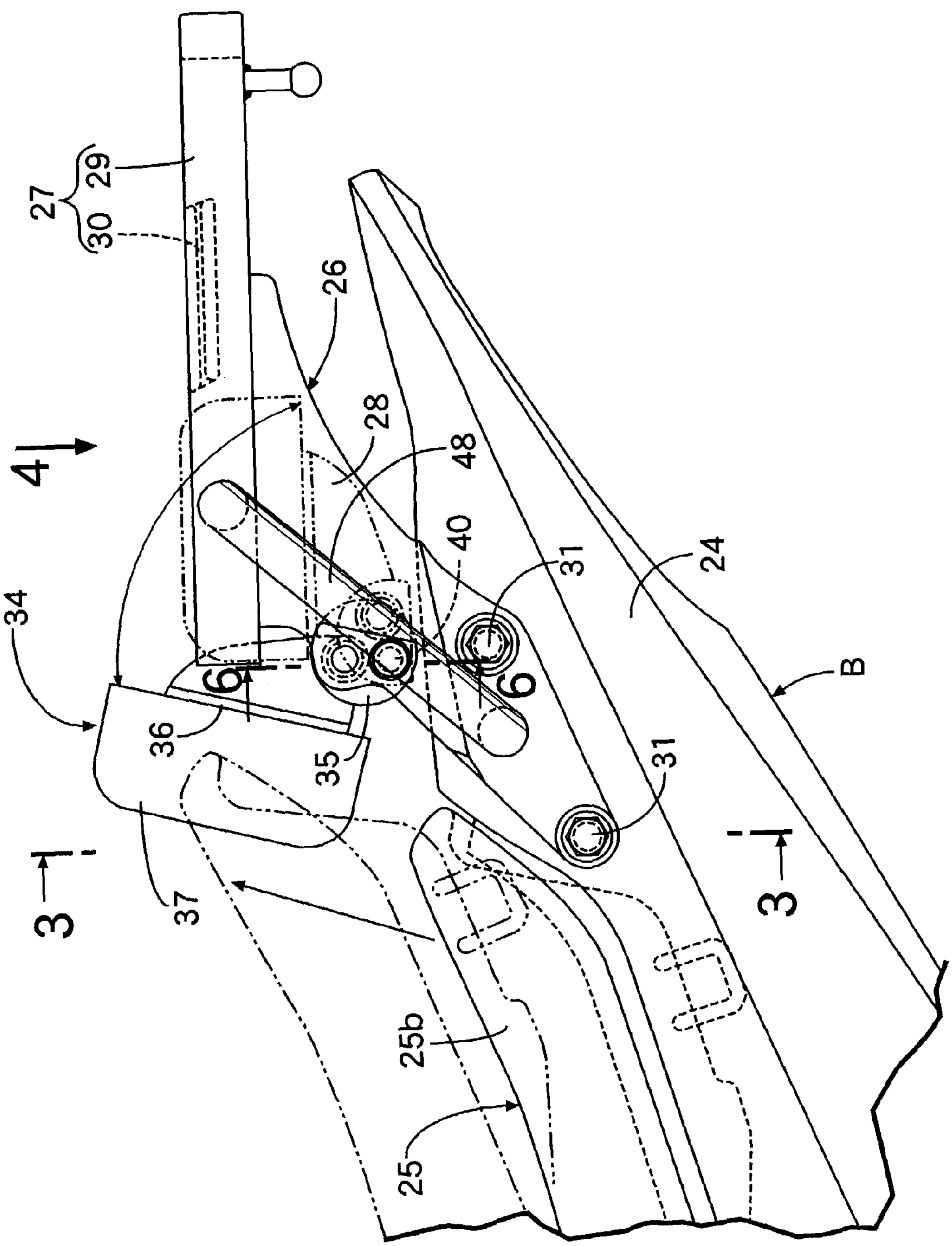
FIG. 2 is an enlarged side view of a rear portion of the motorcycle.
Figure 3:
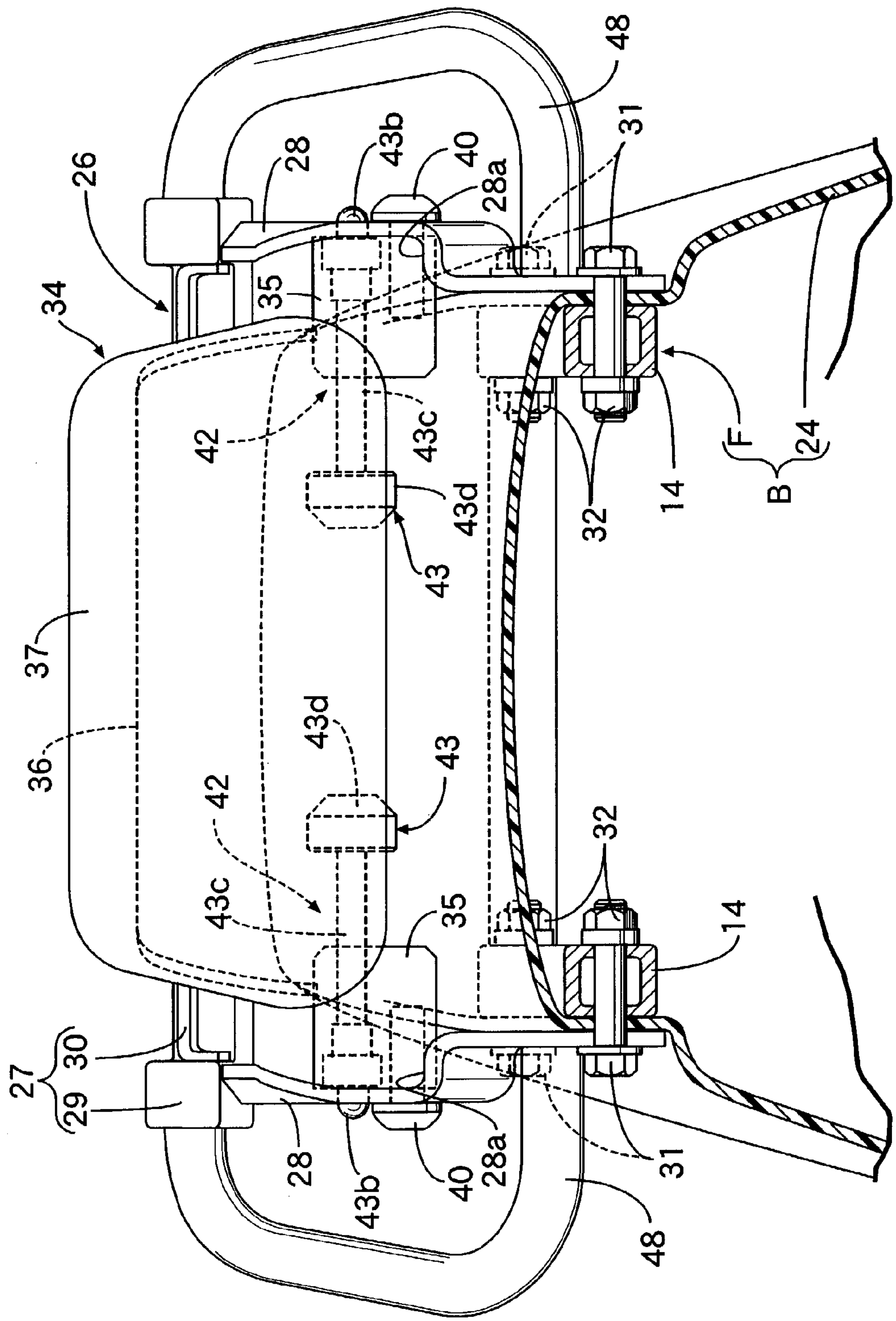
FIG. 3 is a sectional view taken along a line 3—3 in FIG. 2.
Figure 4:
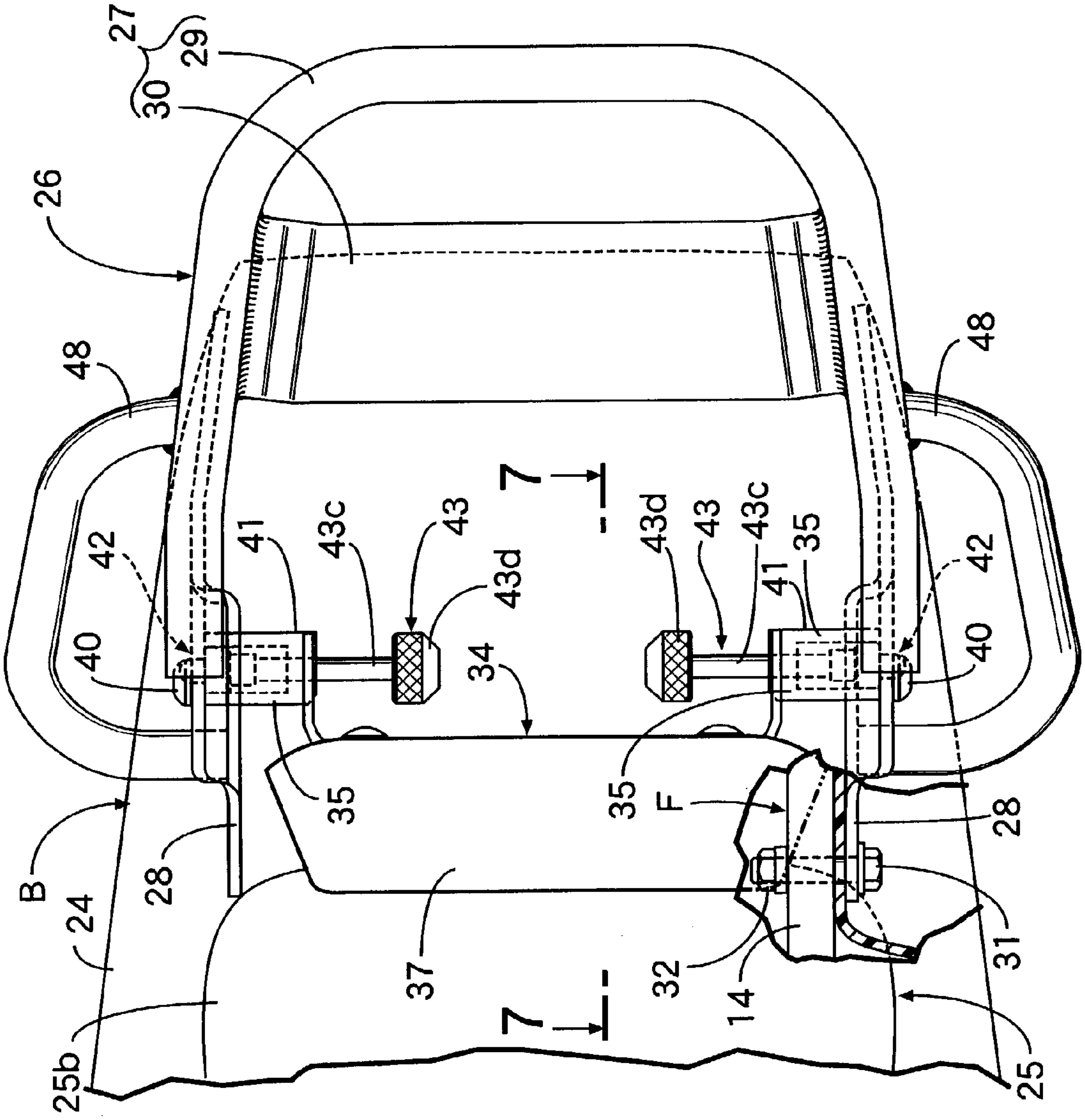
FIG. 4 is a view taken in a direction of an arrow 4 in FIG. 2.

Referring also to FIGS. 2 to 4, a rear portion of the vehicle body framework For, that is, the seat rails 14 are covered with a synthetic resin rear cover 24 which constitutes a vehicle body B by cooperation with the vehicle body framework F. A tandem-type seat 25 is detachably mounted on the vehicle body B in the rear of the fuel tank 10, and includes a main seat portion 25*a* on which a rider sits, and a pillion portion 25*b* which is disposed in the rear of the main seat portion 25*a* and on which a tandem rider sits.

Figure 5:
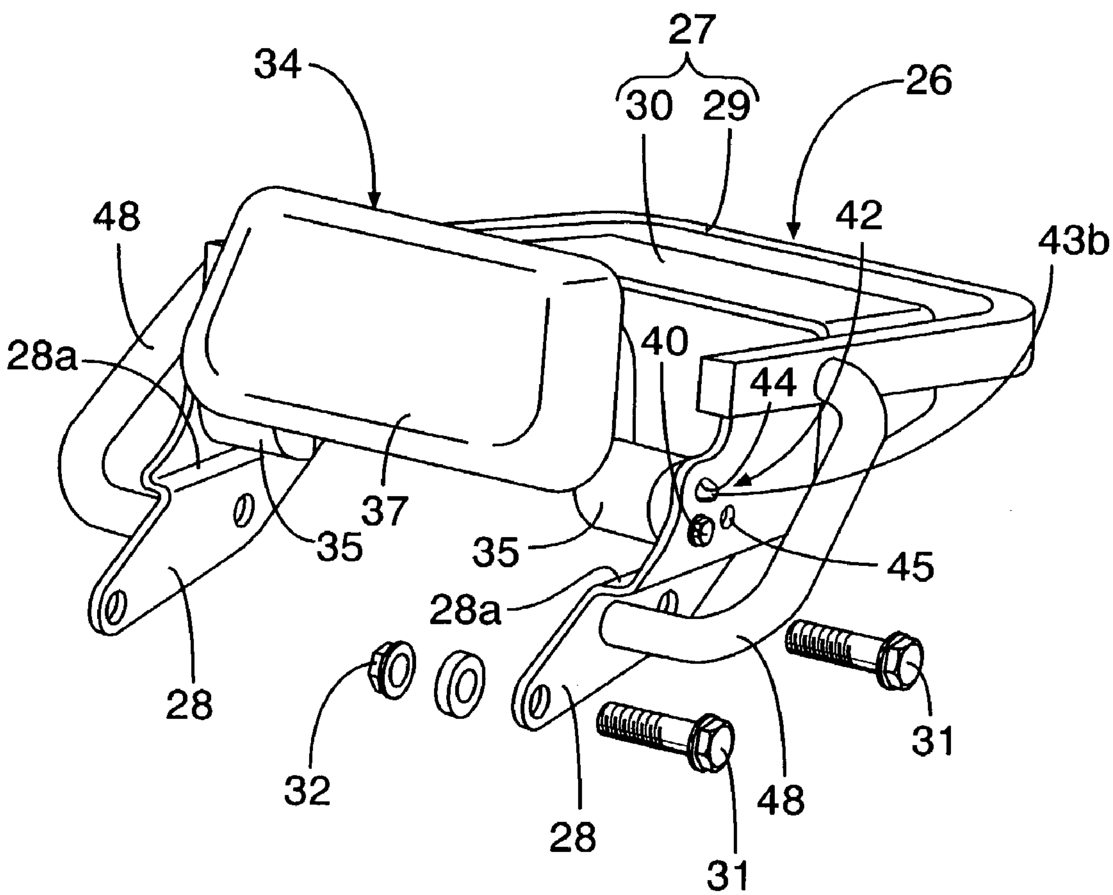
FIG. 5 is a perspective view of a rear luggage-carrier device.

Referring also to FIG. 5, a rear luggage-carrier device 26 is mounted to the vehicle body B in the rear of the pillion portion 25*b*, and includes a rear carrier 27 disposed in the rear of the pillion portion 25*b*, and a pair of stays 28, 28 secured to left and right rear portions of the vehicle body B to support the rear carrier 27.

The rear carrier 27 comprises a frame member 29 formed into a substantially U-shape with its front portion opened in a substantially horizontal plane, and a connecting plate 30 which connects opposite intermediate portions of the frame member 29 to each other. The pair of left and right stays 28, 28 are welded at their upper ends to lower surfaces of opposite sides of the frame member 29.

The pair of left and right stays 28, 28 are disposed on opposite sides of the rear cover 24, and extend rearward upward. The stays 28, 28 are fastened to the seat rails 14, 14, respectively, by a pair of bolts 31 and a pair of nuts 32 so that the rear cover 24 is sandwiched between the stays 28, 28 and the seat rails 14, 14.

A backrest 34 is turnably supported on the stays 28, 28 of the rear luggage-carrier device 26 for turning movement between an upright position in which it is located above a rear end of the pillion portion 25*a* such that it can contact from behind the waist of the tandem rider on the pillion portion 25*a*, and a housed position in which it has been turned rearward from above the rear end of the pillion portion 25*a* and housed in a front portion of the rear carrier 27, so that luggage can be mounted on the backrest 34.

The backrest 34 comprises a pair of supported members 35, 35 opposed to the stays 28, 28 from the sides of inner surfaces, a support plate 36 which connects the supported members 35, 35 to each other, and a seat cushion 37 mounted to the support plate 36.

Figure 6:
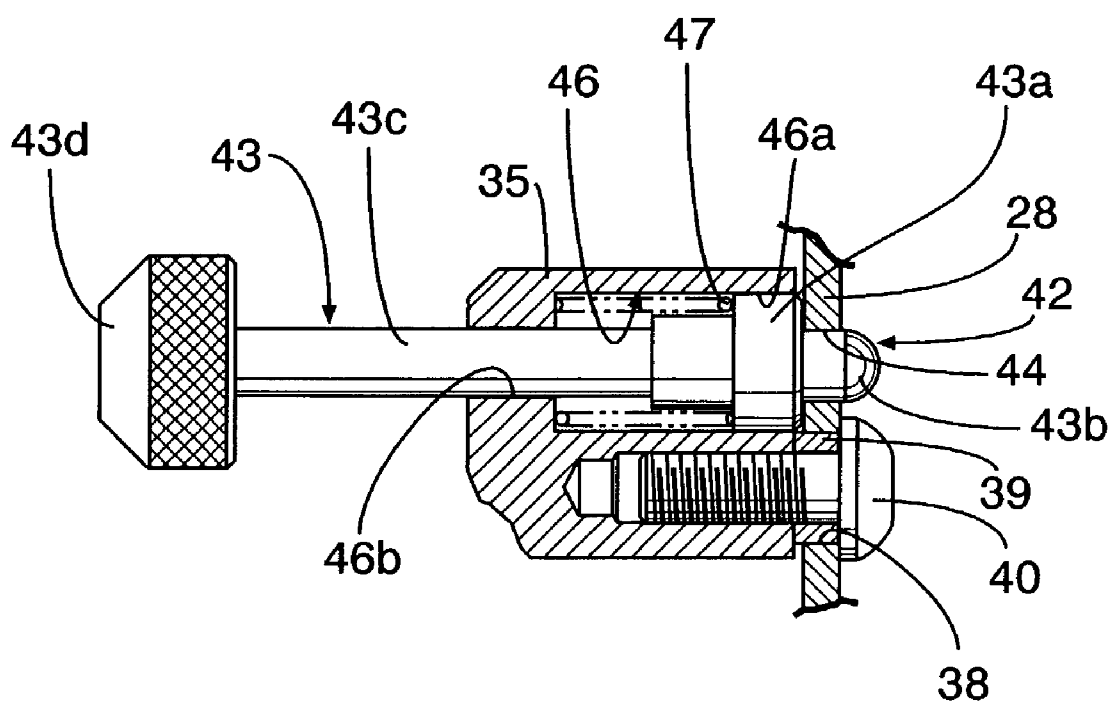
FIG. 6 is an enlarged sectional view showing a supported member in a locked state along a line 6—6 in FIG. 2.
Figure 7:
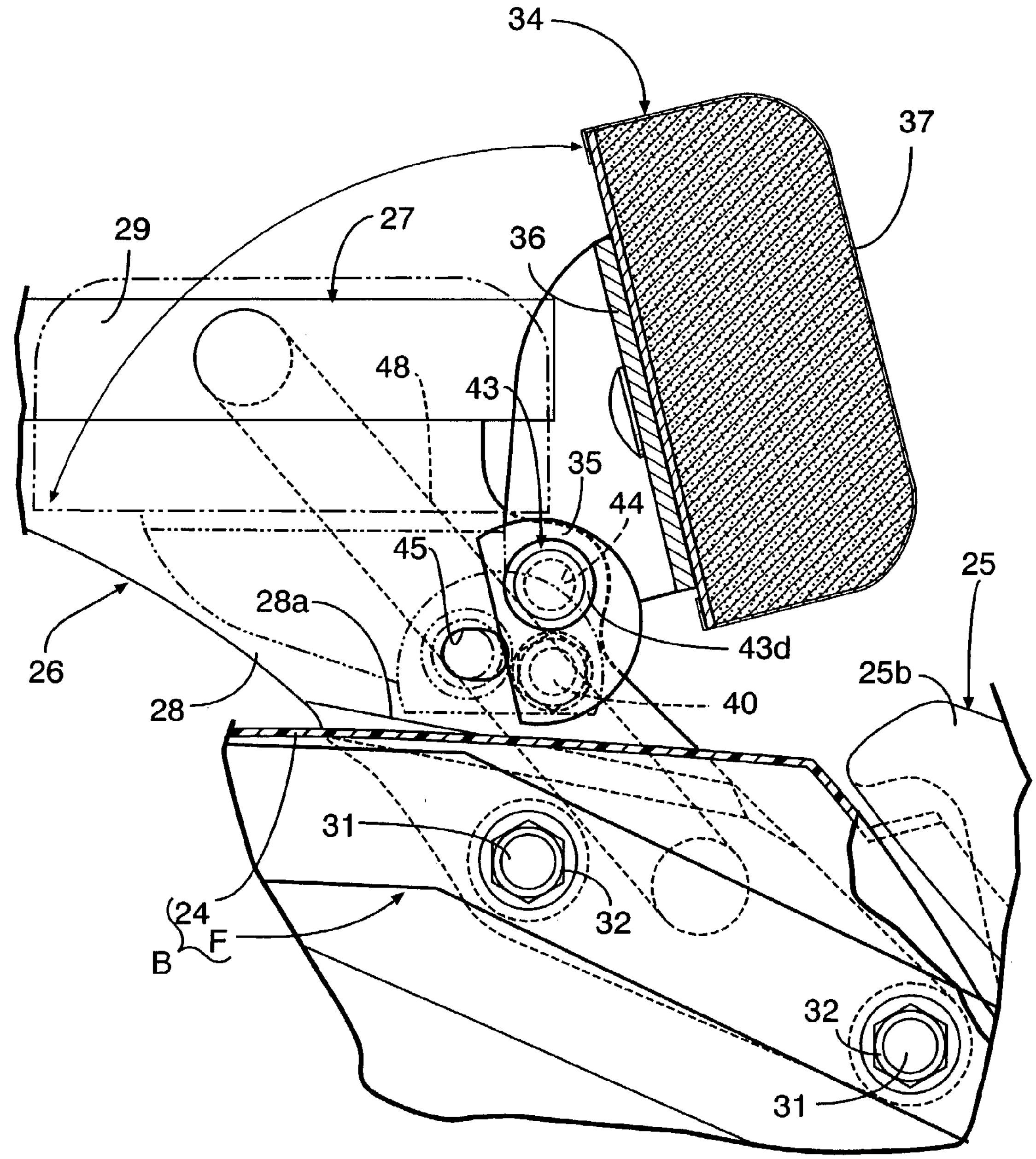
FIG. 7 is a view taken in a direction of an arrow 7 in FIG. 4.

Referring to FIGS. 6 and 7, support bores 38 are coaxially provided in the stays 28, 28, and cylindrical collars 39 are turnably inserted into the support bores 38. Moreover, bolts 40 engaged on outer surfaces of the stays 28 are threadedly fitted into the supported members 35, 35 through the collars 39, and the supported members 35, 35, and thus the backrest 34 are turnably supported on the stays 28, 28 so that they can be turned about axes of the bolts 40.

Each of the stays 28, 28 is bent and formed into a shape with its upper portion bulged outward so that a step 28*a* facing upward is formed on an inner surface of an intermediate portion of each stay 28 in order to dispose the supported member 35 inside an upper portion of the stay 28. On the other hand, each of the supported members 35 is basically of a short columnar shape, but a portion of the supported member 35 is cut off to form a flat surface 41 in order to avoid the interference with the step 28*a* when the backrest 34 is turned from the upright position to the housed position.

Locking mechanisms 42 are provided between the supported members 35, 35 and the stays 28, 28, and each adapted to switch over, from one to another, a state in which the backrest 34 is locked in the upright position and the housed position, and a state in which the locked state is released to permit the turning movement of the backrest 34 between upright position and the housed position.

Each of the locking mechanisms 42 is comprised of a locking pin 43 mounted on the supported member 35, and biased by a spring in a direction to protrude at one end thereof from the supported member 35 toward the stay 28, and a pair of locking bores 44 and 45 provided in the stay 28 such that one end of the locking pin 43 is inserted through and engaged alternatively in any of the locking bores 44 and 45.

A slide bore 46 is provided in each of the supported member 35 in parallel to the bolt 40 at a location displaced from a turning center of the supported member 35, i.e., the axis of the bolt 40. The slide bore 46 comprises a larger-diameter bore portion 46*a* which opens at one end toward the stay 28, and a smaller-diameter bore portion 46*b* having a diameter smaller than that of the larger-diameter bore portion 46*a* and connected coaxially to the other end of the larger-diameter bore portion 46*a*.

The locking pin 43 includes a larger-diameter slide portion 43*a* slidably received in the larger-diameter bore portion 46*a* of the slide bore 46, an engage pin portion 43*b* coaxially connected to the larger-diameter slide portion 43*a*, a slide shaft portion 43*c* which is coaxially connected at one end to the larger-diameter slide portion 43*a* on a side opposite from the engage pin portion 43*b* and which is passed slidably through the smaller-diameter bore portion 46*b*, and an operating portion 43*d* provided at the other end of the slide shaft portion 43*c*. The operating portion 43*d* is formed into a disk-shape with a diameter larger than that of the slide shaft portion 43*c*, and has an outer peripheral surface knurled.

A coil spring 47 is accommodated under compression in the larger-diameter bore portion 46*a* of the slide bore 46 between the larger-diameter slide portion 43*a* and a step between the larger-diameter bore portion 46*a* and the smaller-diameter bore portion 46*b*, so that the locking pin 43 is biased by a spring force exhibited by the coil spring 47 in a direction such that the engage pin portion 43*b* at one end thereof is inserted through and engaged alternatively in any of the locking bores 44 and 45.

On the other hand, one 44 of the pair of locking bores 44 and 45 is provided in the stay 28 such that the engage pin portion 43*b* at one end of the locking pin 43*is* inserted through and engaged in the one locking bore 44 when the backrest 34 is in the upright position, and the other locking bore 45 is provided in the stay 28 such that the engage pin portion 43*b* at one end of the locking pin 43 is inserted through and engaged in the other locking bore 45, when the backrest 34 is in the housed position.

Figure 8:
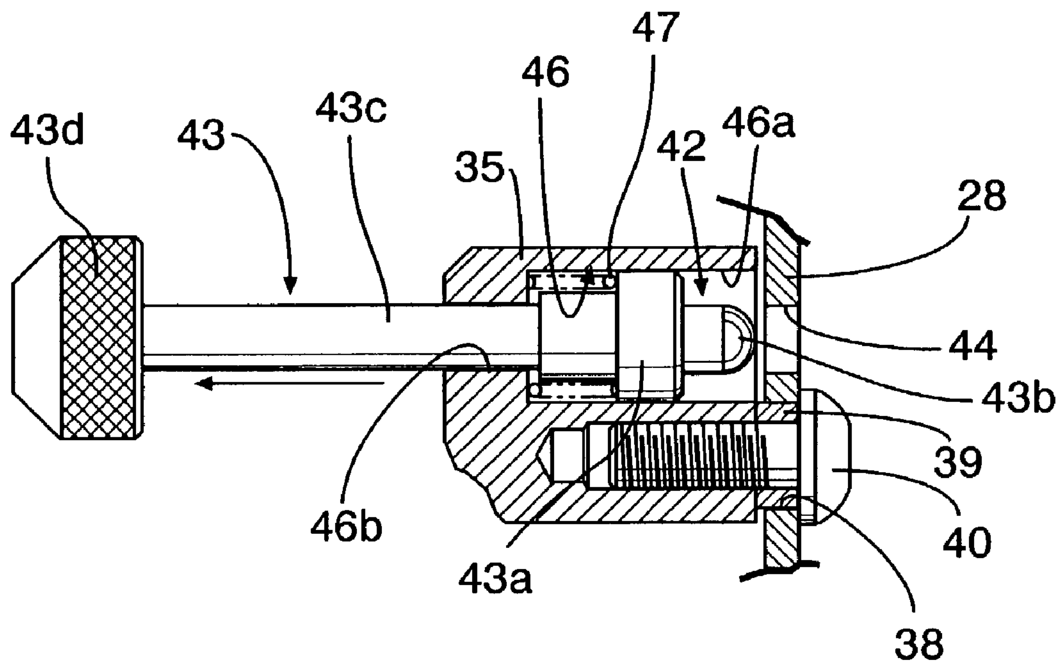
FIG. 8 is a sectional view similar to FIG. 6, but in an unlocked state.

The state in which the locking pin 43 has been inserted through and engaged in any of the locking bores 44 and 45 is maintained by the spring force of the coil spring 47, but when a user grasps the operating portion 43*d* to pull the locking pin 43 inwards, as shown in FIG. 8, the locking pin 43 is slid inwards against the spring force of the coil spring 47, to thereby easily release the state in which the engage pin portion 43*b* has been inserted through and engaged in any of the locking bores 44 and 45.

Grips 48, 48 capable of being grasped by the tandem rider on the pillion portion 25*b* are mounted between opposite sides of the frame member 29 of the rear carrier 27 and both the stays 28, 28. Each of the grips 48, 48 is welded at its opposite ends to the frame member 29 and each of the stays 28, 28.

The operation of this embodiment will be described below. The backrest 34 is supported on the pair of left and right stays 28, 28, so that it can be turned between the upright position in which it is located above the rear portion of the pillion portion 25*b* such that it can contact from behind the waist of the tandem rider on the pillion portion 25*b*, and the housed position in which it has been turned rearward from above the rear end of the pillion portion 25*b* and housed in the front portion of the rear carrier 27, so that luggage can be mounted on the backrest 34. Therefore, in the upright position, a riding comfort of the tandem rider on the pillion portion 25*b* can be improved by bringing the backrest 34 into contact from behind with the waist of the tandem rider on the pillion portion 25*b*. In the housed position, the backrest 34 is housed in the front portion of the rear carrier 27, and hence the backrest 34 does not exist between the rear carrier 27 and the pillion portion 25*b*, so that relatively large luggage can be mounted on the rear carrier 27 such that a portion of the luggage protrudes toward the pillion portion 25*b* when no tandem rider sits on the pillion portion 25*b*. In addition, when the operation of detaching the pillion portion 25*b* from the vehicle body B is carried out, the backrest 34 cannot obstruct this operation, and hence the smooth detaching operation for the pillion portion 25*b* can smoothly be achieved.

In addition, the supported members 35, 35 are mounted on the opposite sides of the backrest 34 and turnably supported on the stays 28, 28. The locking pin 43 is mounted in each of the supported members 35, and biased in the direction to protrude at one end thereof from the supported member 35 toward the stay 28. Each of the stays 28 is provided with the pair of locking bores 44 and 45. The engage pin portion 34*b* at one end of the locking pin 43 is inserted and engaged through the locking bores 44 and 45 in the upright position and the housed position of the backrest 34. The operating portion 34*d* is provided at the other end of the locking pin 34 protruding from the supported member 35 on the side opposite from the stay 28. Therefore, it is possible to easily switch over, from one to another, the state in which it can be locked in the upright position and the housed position, and the state in which the locked state is released to permit the turning movement of the backrest 34 between upright position and the housed position.

Further, the grips 48, 48 capable of being grasped by the tandem rider on the pillion portion 25*b* are mounted between the stays 28, 28 and the rear carrier, and hence the feeling of security of the tandem rider can be enhanced, and the supporting rigidity of the rear carrier 27 can be enhanced.

Although the embodiment of the present invention has been described, it will be understood that the present invention is limited to the above-described embodiment, and various modifications in design may be made without departing from the scope of the present invention defined in the claims.

What is claimed is:

1. A rear luggage-carrier device for a motorcycle, in which a rear carrier disposed in the rear of a pillion portion for a tandem rider is supported by a pair of stays secured to left and right rear portions of a vehicle body, said rear carrier comprising a frame member of a substantially U-shape ooening toward a front side of the motorcycle and a connecting member which connects opposite portions of the frame member wherein a backrest is supported on the pair of stays so that it can be turned between an upright position in which it is located above a rear end of the pillion portion to contact from behind the waist of the tandem rider on the pillion portion, and a housed position in which it has been turned rearward from above the rear end of the pillion portion and housed in a space defined by the frame member and the connecting member of the rear carrier so that luggage can be mounted on the backrest, wherein said backrest comprises a pair of supported members opposed to inner surfaces of the stays, the rear carrier is mounted on upper ends of said stays, and locking mechanisms are provided on the pair of supported members and adapted to switch over, from one to another, a locked state in which the backrest is locked in an upright position and a housed position, and a released state in which the locked state is released to permit the turning movement of the backrest between the upright position and the housed position, each of said locking mechanism comprising a locking pin having an operating portion.

2. A rear luggage-carrier device for a motorcycle according to claim 1, wherein a grip capable of being grasped by the tandem rider on the pillion portion is mounted between the stay and the rear carrier.

3. A rear luggage-carrier device for a motorcycle according to claim 1 or 2, wherein said locking pin is mounted in each of the supported members and biased by a spring in a direction to protrude at one end thereof from the supported member toward each of the stays; a pair of locking bores are provided in each of the stays so that one end of the locking pin is inserted through and engaged in any of the locking bores in the upright position and the housed position of the backrest; and said operating portion is provided at the other end of the locking pin protruding from the supported member on a side opposite from the stay.

4. A rear luggage-carrier device for a motorcycle, in which a rear carrier disposed in the rear of a pillion portion for a tandem rider is supported by a pair of stays secured to left and right rear portions of a vehicle body, wherein a backrest is supported on the pair of stays so that it can be turned between an upright position in which it is located above a rear end of the pillion portion to contact from behind the waist of the tandem rider on the pillion portion, and a housed position in which it has been turned rearward from above the rear end of the pillion portion and housed in a front portion of the rear carrier so that luggage can be mounted on the backrest, and wherein supported members are mounted on opposite sides of the backrest and turnably supported on the stays; a locking pin is mounted in each of the supported members and biased by a spring in a direction to protrude at one end thereof from the supported member toward each of the stays; a pair of locking bores are provided in each of the stays so that one end of the locking pin is inserted through and engaged in any of the locking bores in the upright position and the housed position of the backrest; and an operating portion is provided at the other end of the locking pin protruding from the supported member on a side opposite from the stay.

5. A rear luggage-carrier device for a motorcycle according to claim 4, wherein a grip capable of being grasped by the tandem rider on the pillion portion is mounted between the stay and the rear carrier.

* * * * *